United States Patent [19]

Kausch

[11] Patent Number: 4,677,574

[45] Date of Patent: Jun. 30, 1987

[54] COMPUTER GRAPHICS SYSTEM WITH LOW MEMORY ENHANCEMENT CIRCUIT

[75] Inventor: Marvin L. Kausch, San Jose, Calif.

[73] Assignee: Cromemco, Inc., Calif.

[21] Appl. No.: 642,339

[22] Filed: Aug. 20, 1984

[51] Int. Cl.[4] .......................... G09G 1/16; G06F 3/14

[52] U.S. Cl. .................................... 364/521; 364/518; 340/747; 340/750

[58] Field of Search ................ 364/518, 521; 340/747, 340/723, 750, 703; 382/54

[56] References Cited

U.S. PATENT DOCUMENTS

| | | | |
|---|---|---|---|
| 3,925,776 | 12/1975 | Swallow | 340/717 |
| 3,944,997 | 3/1976 | Swallow | 340/717 |
| 4,317,114 | 2/1982 | Walker | 340/721 |
| 4,364,037 | 12/1982 | Walker | 340/744 |
| 4,405,920 | 9/1983 | Weisstein | 340/723 |
| 4,439,762 | 3/1984 | Van Vliet et al. | 340/750 |
| 4,447,809 | 11/1984 | Kodama et al. | 340/747 |
| 4,484,188 | 11/1984 | Ott | 340/723 |
| 4,500,875 | 2/1985 | Schmitz | 340/723 |
| 4,551,768 | 11/1985 | Tsuchiya et al. | 382/54 |

*Primary Examiner*—Felix D. Gruber
*Assistant Examiner*—Danielle B. Laibowitz
*Attorney, Agent, or Firm*—Paul Hentzel

[57] ABSTRACT

Edge data is stored in a bit map, and clocked out pixel by pixel to form a pixel data stream for display. The edge data defines the regions or faces in the display image which have the same color. The face edges form transitions in the data stream (0-to-1 or 1-to-0), and are detected by an edge detector for generating sequential color addresses. The color data for each face is stored in a color memory in the order of appearance, and is accessed at each edge transition when a color change is required. The color address associated with each edge transition accesses the color for that face from the color memory. Each pixel in the display has a corresponding bit in the pixel map; and each color change in the display has a location in the color memory. The pixel data is sequentially accessed from the pixel memory by the pixel clock. The color data is sequentially accessed by the pixel transitions and synchronized into the display at each face edge.

26 Claims, 2 Drawing Figures

FACE COLOR
SYSTEM 100

GENERAL SYSTEM
SYSTEM 200

COMPUTER GRAPHICS SYSTEM WITH LOW MEMORY ENHANCEMENT CIRCUIT

TECHNICAL FIELD

This invention relates to video display systems, and more particularly to video display systems with low memory requirements.

BACKGROUND

Heretofore, the pixel map memory size (PM) required to display an image Y scanlines long and X pixels wide with C color bits was:

(X pixels)(Y lines)(C color bits) = Pixel Memory Size (X)(Y)(C) = PM.

The XY pixel area of the display image (a very large number of bits) was multiplied by the color requirement to produce an even greater bit requirement.

Walker U.S. Pat. No. 4,364,037 shows an XYC pixel memory map which contains only edge and color data of the faces forming the display image. Non-edge pixels between the face edges fill the bulk of the map, The non-edge portion of the map is maintained at "0"s (background code). During each interframe update, the entire memory map is reset to "0", and the next frame of edge-color data is loaded. The interframe update time is greatly reduced because only the edge data must be entered on a bit-by-bit basis.

Walker U.S. Pat. No. 4,317,114 shows an XYC pixel map in which grids, legends, and formats may be added by an XY overlay memory. In one embodiment, an XY pixel map was employed containing only edge data. Color was added by an XYC overlay memory.

SUMMARY

It is therefore an object of this invention to provide an improved computer graphics system.

It is another object of this invention to provide a graphics system having maximum display features with minimum memory requirement.

It is a further object of this invention to provide a color graphics system having a one bit edge map and a separate color memory.

It is a further object of this invention to provide a color graphics system having a pixel width which is less than the color memory access time.

It is a further object of this invention to provide a graphics system capable of displaying faces one pixel wide.

Briefly, these and other objects of the present invention are accomplished by providing an apparatus for receiving image ancillary data (color) base pixel data (edge data), to provide an composite pixel data stream to a raster scan display monitor for displaying a preconfigured graphic image. An image source provides the image ancillary data into an ancillary memory, and the base pixel data in a serial stream in sequential order of display defining an image raster having X pixels in each of Y scanlines. The pixel data has M bits of binary data with 2-to-the M binary codes. At least one of the codes is an ancillary code. An enhancement code detector responsive to the serial stream of pixel data detects the ancillary code. An ancillary address means responsive to the ancillary code detector provides a sequence of A bit ancillary addresses. An ancillary memory containing L locations with E bits at each location, stores the ancillary data. The ancillary addresses access the ancillary memory to provide composite pixel data to the monitor.

BRIEF DESCRIPTION OF THE DRAWING

Further objects and advantages of the ancillary circuit and the operation of ancillary memory will become apparent from the following detailed description and drawing in which.

FACE COLOR SYSTEM 100—CIRCUIT DIAGRAM (FIG. 1)

Figure 1:
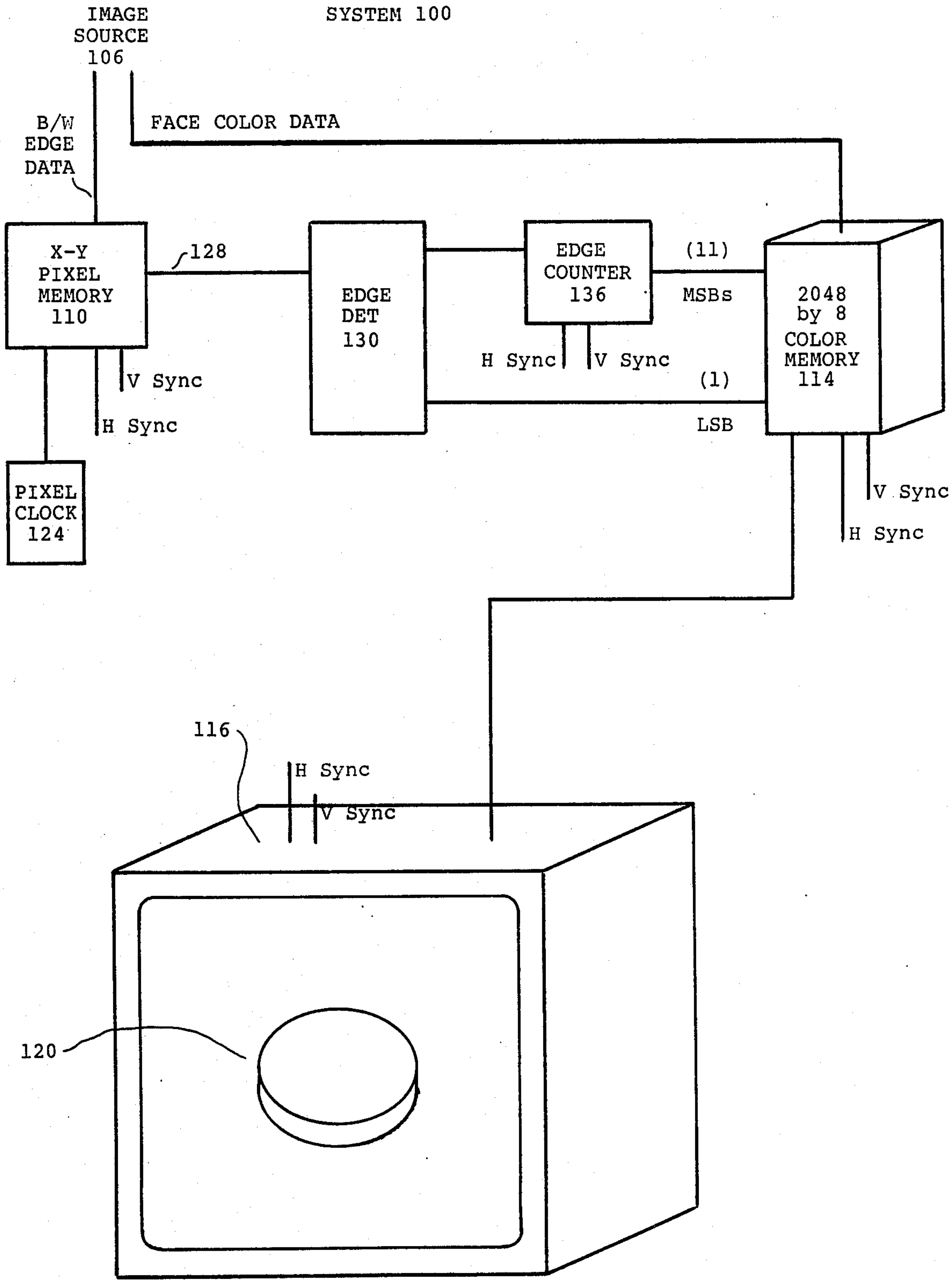
FIG. 1 is a block diagram of a face color embodiment showing a 1 bit edge map and a separate color memory.
Figure 2:
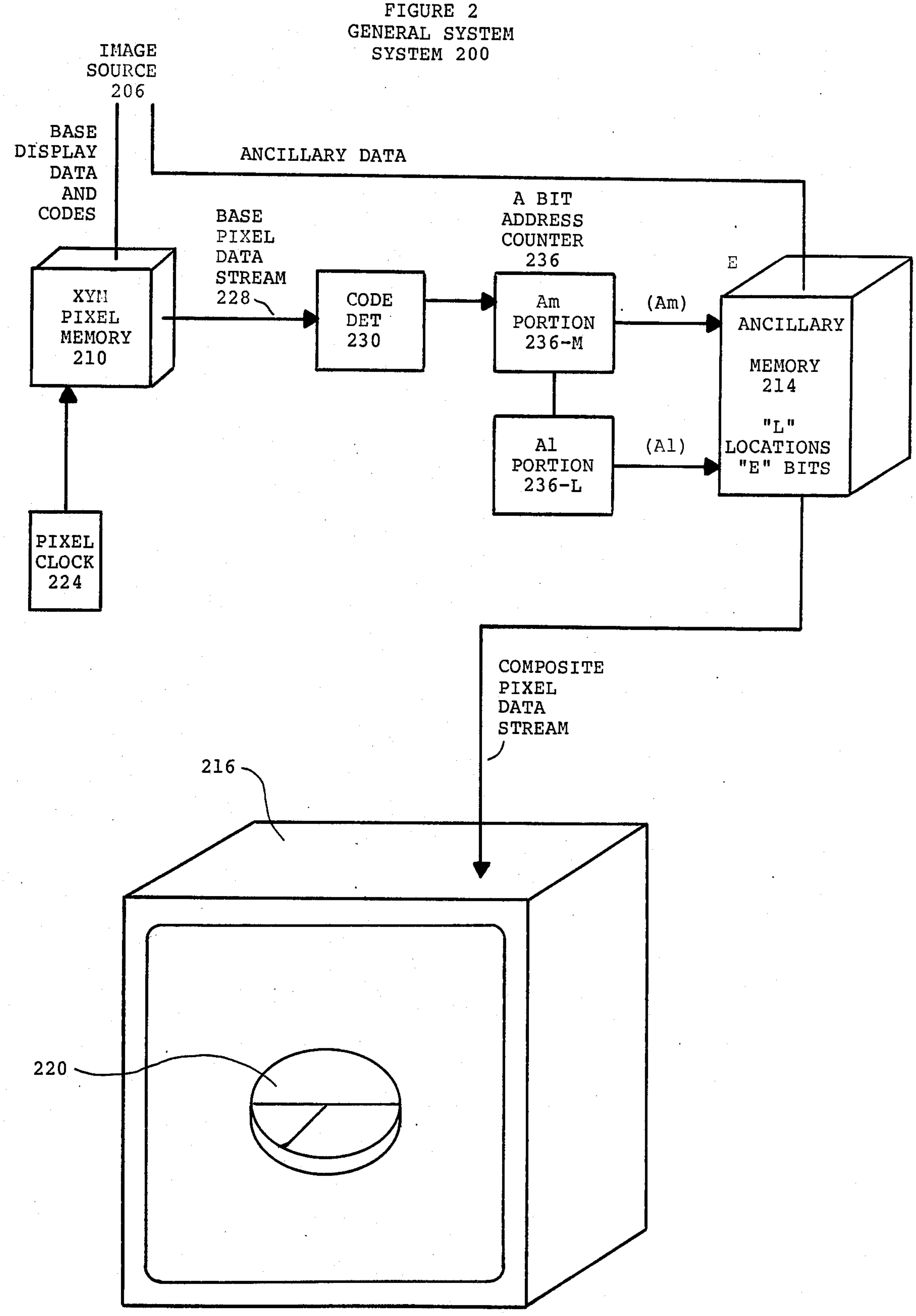
FIG. 2 is a block diagram of a general graphics system showing an M bit map with an ancillary memory.

System 100 receives two types of input data from data source 106; black and white data into XY pixel memory 110, and face color data into color memory 114. The input data is combined by system 100 to provides edge-color data to display monitor 116 for displaying image 120. Pixel memory 110 is a bit map memory (three TMS-3536s) for containing a display frame having 240 scanlines each with 960 pixels. Pixel memory 110 contains only one bit per pixel for providing the black (0) and white (1) edge data for the face boundaries in image 120. Color memory 114 is a look up table with 2048 eight bit locations (Hm-6116-12), and permits 4096 four bit color changes per frame of image 120. Each memory 110 and color memory 114 are loaded during each interframe vertical interval with an entire display frame of data containing all of the face edges and face colors forming image 120.

The pixel bits in pixel memory 110 are sequentially accessed by pixel clock 124 (21.6 MegaHertz, 46 nanosecond period) to form edge data stream 128. These bits of edge data are either "0"s or "1"s, and switch values at the leading pixel of each new face. The pixels between the leading edge and tailing edge of each display face within a scanline are either all "0"s or all "1"s. The 0-to-1 and 1-to-0 transitions define the edges between adjacent display faces. The leading bit of each transition in edge data stream 128 forms the leading pixel in each new face.

Pixel memory 110 provides the image edge data to edge detector 130 (flip-flop 74LS74) in the order of display on monitor 116 (TTL compatible input monitor PGS-HX12). Edge detector 130 responds to odd edge transitions (0-to-1) to increment edge counter 136. Counter 136 may be a synchronous binary counter (74LS163) for providing sequential 11 bit addresses to color memory 114 in response to the odd transitions. Edge detector 130 responds to both odd and even transitions for determining the LSB (the 12th bit) to color memory 114. Edge detector 130 provides a "0" LSB in response to odd edge transitions, and a "1" LSB in response to even edge transitions. Each odd transition generates a 12 bit address to color memory 114 (11 MSBs and a LSB). The 11 bits address the next eight bit location, and the 12th bit addresses the first four bits in that location. The subsequent even edge transition merely advances the LSB from "0" to "1", addressing the second four bits in the previous odd transition location. The odd transition addressing requires slightly less than three pixels (138 nano seconds), while the even bit addressing requires only a fraction of a pixel (about 20 nano seconds).

2048 COLOR PAIRS—FACE PAIRS

The color data in memory 114 associated with each edge transition in data stream 128 is arranged in sequential color pairs, a foreground color (FGC) plus a background color (BGC). A FGC is the color of any foreground face (FGF), any face having a limited horizontal dimension of three pixels (or less) in that display scanline. FGFs have a run of three pixels (or less) in edge data stream 128. A BGC is the color of any background face (BGF), any face having an extended horizontal dimension of four pixels (or more) in that display scanline. BFGs have a run of four pixels (or more) in edge data stream 128. The same display color can be both a FGC for FGFs and a BGC for BGFs.

Each 11 bit address to color memory 114 accesses 8 bits of color data containing a four bits of a FGC and four bits of the immediately subsequent BGC. When the LSB (the 12th bit) from edge detector 130 is "0" (even transition), the four FGC bits are accessed. When the LSB is incremented to "1" (odd transition) by the immediately subsequent even transition in data stream 128, the four BGC bits are accessed.

Each FGC and BGC color must be displayed on monitor 116 until the next color is accessed from memory 114. The 12 bit access time required to terminate a BGC (odd transition) and access the next FGC (even transition) is 138 nano seconds:

15 ns for flipping edge detector 130, 15 ns for incrementing counter 136, and 100 ns for 12 bit addressing a new color pair.

The pixel duration of each X=960 by Y=240 frame is about 46 ns.

Odd transitions (1-to-0) must be displayed for three pixel periods while the next FGC is being accessed. Therefore, the minimum width of BGC faces (odd transitions) along a scanline is three pixels. The 1 bit access time required to terminate a FGC (even transition) and access the next BGCs is only about 30 nano seconds:

15 ns for flipping detector 130, and 15 ns for one bit addressing of color table 114.

Even transitions (0-to-1) must be displayed for one pixel period while the next BGC is being accessed. Therefore, minimum width of FGC faces (even transitions) along a scanline is one pixel. However, FGFs of three pixels (or less) may be maintained in the even position in data stream 128 by inserting a pseudo BGC (no color change) just after the preceding real BGF.

System 100 has a one pixel access time to color memory 114 for odd transitions, and can display one pixel faces of any FGC contained in an even location of color memory 114. Each four pixel (or greater) BGF in image 120 must be supported by four pixels (or more) in pixel memory 110 and edge data stream 128. The first pixel in the edge data stream changes the color on display monitor 116. The subsequent three pixels are consumed in accessing color memory 114, before the displayed color changes. Even memory faces can be accessed in less than one pixel period.

OPERATIONAL MODES

Embodiment 100 employs a frame operational mode. The 2096 color pairs (or less) may be distributed throughout each frame without limitation. However, frame wide error accumulation in color memory 114 may become a burden to the graphics personnel. Each individual error in color location causes a shift in all subsequent locations in each remaining scanline of the frame.

A scanline operational mode may employed in a 256 scanline embodiment, by dividing the 2096 color pairs in color memory 114 into 256 equal sections, providing eight color pairs for each scanline. The error accumulation is only scanline wide. However each scanline has a 16 color limit allocated on a lost-if-not-used basis.

A differential edge density mode may be employed to permit more color changes in the midscreen region. The scanlines in the top and bottom margin regions are allocated fewer color pairs because these regions are frequently homogeneous for spacing and vertical balance. More color pairs are available for the center region which usually has a higher face density and consumes more color pairs per scanline.

A five region, three density allocation is given in the following table for a 256 line embodiment:

| REG NO | POSITION IN FRAME | LINE NO | TOTAL LINES | EDGE DEN-SITY | COLOR PAIRS PER REGION |
|---|---|---|---|---|---|
| 1 | Top Margin | 1-44 | (44) | 4 | 176 |
| 2 | Upper | 45-84 | (40) | 8 | 320 |
| 3 | Middle | 85-172 | (88) | 12 | 1056 |
| 4 | Lower | 173-212 | (40) | 8 | 320 |
| 5 | Bot Margin | 213-256 | (44) | 4 | 176 |
| | | | | | **** |
| | | | | | 2048 |

The center regions scanlines may have an edge density three times the edge density of the upper and lower margin regions. Other density ratios and region selection may be employed.

SPECIFIC EMBODIMENT

Face color system 100 is given as an illustrative example, to show the operation of edge detectors and color memory. The values and IC components are not intended as defining the limitations of the invention. Numerous other configurations are possible. Detailed information concerning the IC components is available in "TTL Data Book for Engineers" published by Texas Instruments Inc., which is hereby incorporated by reference in its entirety into this disclosure.

GENERAL ANCILLARY SYSTEM (FIG. 2)

System 200 provides color and/or other ancillary features such as intensity data or non-displayed codes for controlling the display format of image 220 on display monitor 216. The image source 206 for system 200 may be a continuous data stream from a CPU, or a frame-by-frame update from a memory map, or other suitable memory device. Pixel memory 210 has M bits of display data and ancillary codes for each pixel. Pixel memory provides base pixel data stream 228 in sequential order of display on display monitor 216 in response to a suitable pixel address device such as a pixel clock 224.

Edge code detector 230 is responsive to each ancillary code in pixel data stream 228 for incrementing address counter 236 which provides a new A bit address at each increment. Each A bit address accesses one of the 2-to-the-A locations (L) in ancillary memory 214. Each of the L locations has E bits of ancillary data. Each A bit memory address has a most significant portion (Am) from Am portion 236-M of the counter which accesses one of Lm major memory units. Each A bit ancillary memory address also has a least significant portion (Al) form Al portion 236-L of the counter which accesses one of Ll E bit subunits within each major memory unit.

| | |
|---|---|
| A = Am + Al | Lm = 2-to-the-Am |
| L = (Lm) × (Ll) | Ll = 2-to-the-Al |

Accessing a foreground feature in an E bit subunit with A bits of address requires the full access time (Tf) of ancillary memory 214; while accessing a background feature in an E bit subunit with only Al bits of address requires only part of the access time (Tb).

The minimum number of pixels in a foreground feature permitted in system 200 is the whole number Pf determined by dividing Tb by the pixel clock period. The minimum number of pixels in a background feature permitted in system 200 is the whole number Pb determined by dividing Tf by the pixel clock period.

CONCLUSION

Clearly various changes may be made in the structure and embodiments shown herein without departing from the concept of the invention. Further, the features of the embodiments shown in the various Figures may be employed with the embodiments of the other Figures.

Therefore, the scope of the invention is to be determined by the terminology of the following claims and the legal equivalents thereof.

I claim as my invention:

1. An apparatus for receiving image ancillary data, and for receiving base pixel data, for providing a composite pixel data stream to a raster scan display monitor for displaying a preconfigured graphic image, comprising:

image source means for providing the ancillary data, and for providing the base pixel data in a serial stream in sequential order of display to define an image raster display having X pixels in each of Y scanlines;

each pixel of the base pixel data having M bits of binary data with 2-to-the M binary codes at least one of which is an ancillary code;

anclllary code detector responsive to the base pixel data in the serial stream of pixel data for detecting the at least one ancillary code therein;

code counter means responsive to the ancillary code detector for providing a sequence of ancillary addresses each having A bits therein, each of the A bits of address having a most significant portion of Am bits and a least significant portion of Al bits; and ancillary memory containing L locations with E bits of memory at each location for storing the ancillary data provided by the image source means, and responsive to the ancillary addresses from the code counter means for providing the composite pixel data to the monitor, the Am bits of address access Lm major memory units within the ancillary memory, and the Al bits of address access Ll subunits of memory within each of the Lm major memory units, the access time required for the Al portion to address a memory subunit in the ancillary memory is shorter than the access time required for the full A bits to address a memory subunit in the ancillary memory.

2. The apparatus of claim 1, wherein the image source means further comprises a pixel memory means.

3. The apparatus of claim 2, wherein the pixel memory means is a pixel bit map memory of the displayed image having X-Y locations.

4. The apparatus of claim 3 wherein the bit map memory map holds one raster frame of base pixel data.

5. The apparatus of claim 3, further comprising a sequential pixel address means for sequentially accessing the base pixel data in the bit map memory to form the serial stream of base pixel data.

6. The apparatus of claim 5, wherein the sequential pixel address means is a pixel clock.

7. The apparatus of claim 1, wherein

Am bits+Al bits=A bits, and (Lm locations)×(Ll locations)=L locations.

8. The apparatus of claim 1, wherein

Al bits=1 bit, and

A bits=Am bits+1 bit.

9. The apparatus of claim 1, wherein the ancillary code counter and the ancillary memory are operated in a frame mode permitting 2-to-the-A changes in ancillary data per display frame.

10. The apparatus of claim 1, wherein the ancillary code counter and the ancillary memory are operated in a scanline mode in which each scanline is allocated 2-to-the-A divided by Y locations in the ancillary memory, permitting 2-to-the-A divided by Y changes in ancillary data per scanline frame.

11. The apparatus of claim 1, wherein the scanlines in the middle region of the display are allocated more locations in the ancillary memory than the scanlines in the upper and lower regions of the display, and the ancillary code counter and the ancillary memory are operated in a differential change density mode in which the scanlines in the middle region of the display are permitted higher ancillary change densities.

12. The apparatus of claim 1, wherein the allocation of ancillary memory locations per scanline progressively increases toward the center of the display, and the ancillary code counter and the ancillary memory are operated in a differential change density mode in which the ancillary change density progressively increases toward the middle of the display.

13. The apparatus of claim 1, wherein the M bits of base pixel data in the XY image source means is edge data for the faces in the displayed image.

14. The apparatus of claim 13, wherein M=1 and the ancillary codes are "0" and "1".

15. The apparatus of claim 14, wherein the ancillary code detector is responsive to the transition from 0-to-1 and the transition from 1-to-0 for incrementing the ancillary address means.

16. The apparatus of claim 15, wherein all of the bits of edge data between each 0-to-1 transition and the subsequent 1-to-0 transition are "1"s, and all of the bits of edge data between 1-to-0 transition and the subsequent 0-to-1 transition are "0"s.

17. The apparatus of claim 14, wherein the ancillary code detector is a transition detector for detecting face edges in the edge data stream.

18. The apparatus of claim 17, wherein the code counter means comprises:

a counter for counting every other edge transition in the edge data stream to provide the most significant A minus one bits of the A bit address to the ancillary memory for accessing the major unit of memory therein; and a one bit counter for detecting every edge transition in the edge data stream to provide the LSB of the A bit address to the ancillary memory for accessing one of two memory subunits Lf and Lb within each major memory unit.

19. The apparatus of claim 18, wherein at least a portion of the Lf memory subunits contain display data for a foreground face.

20. The apparatus of claim 19, wherein the Lf subunits are accessed by the full A bit address in time Tf, and the Lb subunits are accessed by the LSB of the address in time Tb.

21. The apparatus of claim 20, wherein Tb is less than Tf.

22. The apparatus of claim 21, wherein the current display face associated with the currently accessed memory subunit in the ancillary memory is displayed on the monitor and terminated when the next subunit is accessed providing the next display face.

23. The apparatus of claim 22, wherein access time Tb requires Pf pixel periods and is the minimum number of display pixels for a foreground face, and the access time Tf requires Pb pixel periods and is the minimum number of display pixels for a background face.

24. The apparatus of claim 23, wherein Pf is one pixel.

25. The apparatus of claim 23, wherein the ancillary data is grey scale data.

26. The apparatus of claim 23, wherein the ancillary data in the ancillary memory is color data.

* * * * *